(12) United States Patent
Kataoka

(10) Patent No.: US 6,200,921 B1
(45) Date of Patent: Mar. 13, 2001

(54) SOLID CATALYST COMPONENT FOR OLEFIN POLYMERIZATION AND CATALYST

(75) Inventor: Takuo Kataoka, Kanagawa (JP)

(73) Assignee: Toho Titanium Co., Ltd., Chigasaki (JP)

( * ) Notice: Subject to any disclaimer, the term of this patent is extended or adjusted under 35 U.S.C. 154(b) by 0 days.

(21) Appl. No.: 09/403,048

(22) PCT Filed: Feb. 24, 1999

(86) PCT No.: PCT/JP99/00845

§ 371 Date: Oct. 26, 1999

§ 102(e) Date: Oct. 26, 1999

(87) PCT Pub. No.: WO99/43718

PCT Pub. Date: Sep. 2, 1999

(30) Foreign Application Priority Data

Feb. 26, 1998 (JP) .................................................. 10-062126

(51) Int. Cl.[7] .............................. B01J 21/00; B01J 21/06; B01J 21/10
(52) U.S. Cl. .......................... 502/115; 502/103; 502/114; 502/116; 502/118; 502/125; 502/127; 526/123.1; 526/126; 526/128
(58) Field of Search .................................... 502/103, 114, 502/115, 116, 118, 125, 127

(56) References Cited

U.S. PATENT DOCUMENTS 5,547,912 * 8/1996 Kataoka et al. ...................... 502/154
5,629,390 * 5/1997 Nishimura et al. ................... 526/114

FOREIGN PATENT DOCUMENTS 0 376 145 * 4/1990 (JP) ......................................... 4/656

* cited by examiner

Primary Examiner—Mark L. Bell
Assistant Examiner—Michael J. DiVerdi
(74) Attorney, Agent, or Firm—Oblon, Spivak, McClelland, Maier & Neustadt, P.C.

(57) ABSTRACT

The objective of the present invention is to provide a solid catalyst component and a catalyst for polymerization of olefins, which shows a high activity, can lower the rate of forming a polymer having a low molecular weight or a low stereoregular polymer which is soluble in a polymerization solvent and can obtain a high stereoregular polymer in a high yield.

The present invention is a solid catalyst component(A) for polymerization of olefins prepared by contacting (a) dialkoxymagnesium, (b) a titanium compound, (c) a diester of an aromatic dicarboxylic acid, (d) an aromatic hydrocarbon and (e) an organic silicon compound containing a hydroxyl group, and a catalyst for polymerization of olefins prepared from the solid catalyst component (A), an organic aluminum compound (B) represented by the general formula $R^2_p AlQ_{3-p}$ and an organic silicon compound (C) represented by the general formula $R^3_q Si(OR^4)_{4-q}$.

28 Claims, No Drawings

SOLID CATALYST COMPONENT FOR OLEFIN POLYMERIZATION AND CATALYST

TECHNICAL FIELD

The present invention relates to a solid catalyst component and catalyst for polymerization of olefins, which can provide a polymer having a high stereoregularity in a high yield, further, relates to a solid catalyst component and catalyst for polymerization of olefins, which shows high activity and also can control a forming rate of a polymer having a low molecular weight or a low stereoregularity which is soluble in a polymerization solvent at a low level at a slurry polymerization of propylene.

TECHNICAL BACKGROUND

In the polymerization of olefins, many proposals have hitherto been made for a solid catalyst component containing magnesium, titanium, an electron donor compound and halogen as essential components and a process for the polymerization or the co-polymerization of olefins in the presence of a catalyst for polymerization of olefins comprising said solid catalyst component, an organic aluminum compound and an organic silicon compound. For example, JP-A-57-63310 and JP-A-57-63311 (The term "JP-A" as used herein means an "unexamined published Japanese patent application") propose a process for polymerizing an olefin having 3 or more carbon atoms using a catalyst comprising a solid catalyst component containing a magnesium compound, a titanium compound and an electron donor compound, an organic aluminum compound and an organic silicon compound having Si—O—C bond.

JP-A-63-92614 proposes a solid catalyst component for polymerization of olefins prepared by bringing a dialkoxymagnesium, a diester of an aromatic dicarboxylic acid, an aromatic hydrocarbon, a titanium halide and calcium chloride into contact.

On the other hand, JP-A-1-315406 proposes a catalyst for polymerizing olefins comprising a solid catalyst component prepared by contacting titanium tetrachloride with a suspension formed by diethoxymagnesium with an alkylbenzene, adding phthalic dichloride thereto to react to obtain a solid product, and further contacting the resulting solid product with titanium tetrachloride in the presence of an alkylbenzene, an organic aluminum compound and an organic silicon compound, and a process for polymerizing olefins in the presence of said catalyst.

The foregoing known techniques focus on having a high activity enough to allow the omission of a so-called deashing step, i.e., a step of removing catalyst residues such as chlorine and titanium remaining in the polymer produced as well as on enhancing the yield of stereoregular polymer or improving durability of the catalyst activity during polymerization, and achieved excellent results to these purposes. However, further improvement of rigidity of an olefin polymer is required in recent years. Therefore, the catalysts of the foregoing known techniques are not always satisfactory for the requirement.

In the slurry polymerization process which requires a solvent at the polymerization, a polymer having a low molecular solvent weight or a low stereoregularity, which is soluble in a polymerization solvent, is formed (hereinafter occasionally referred to as "polymerization solvent-soluble polymer"), especially in the polymerization of propylene, a polymer so-called "an atactic polypropylene" (hereinafter occasionally referred to as "APP") is formed. In case of increasing of the forming rate of the polymerization solvent-soluble polymer, it concerns about an undesirable effect to the operation of the process and the production cost of a polymer, because a pipeline may be blocked up during polymerization and because when the polymerization solvent-soluble polymer remains in a polymer to be a product a step for removal of the polymerization solvent-soluble polymer to cause stickiness, etc. from the polymer to be a product is required after polymerization. However, the use of the catalyst of the foregoing known techniques is not enough to solve the problems.

The objective of the present invention is to solve the foregoing problems remaining in the prior art techniques and to provide a solid catalyst component and a catalyst for polymerization of olefins, which shows a high activity and can lower the rate of forming a polymerization solvent-soluble polymer and can obtain a high stereoregular polymer in a high yield.

DISCLOSURE OF THE INVENTION

As a result of extensive investigations to solve the foregoing problems remaining in the prior art techniques, the present inventors have found that when olefins are polymerized by using a solid catalyst component preparing from a magnesium compound, a tetravalent halogen-containing titanium compound, a diester of an aromatic dicarboxylic acid, an aromatic hydrocarbon and a silicon compound containing a hydroxyl group, a polymer having a low rate for forming a polymerization solvent-soluble polymer can be obtained with maintaining a catalyst activity and a stereoregularity of the resulting polymer in a high level, especially in a slurry polymerization, and achieved the present invention based on the finding.

A solid catalyst component for polymerization of olefins of the present invention is prepared by contacting (a) dialkoxymagnesium (hereinafter occasionally referred to as "component (a)"), (b) titanium compound represented by the general formula $Ti(OR^1)_n X_{4-n}$ (wherein $R^1$ represents a $C_{1-4}$-alkyl group; X represents a chlorine atom, a bromine atom and an iodine atom; and n represents a real number of from not less than 0 to not more than 3) (hereinafter occasionally referred to as "component (b)"), (c) a diester of an aromatic dicarboxylic acid(hereinafter occasionally referred to as "component (c)"), (d) an aromatic hydrocarbon (hereinafter occasionally referred to as "component (d)") and (e) a silicon compound containing a hydroxyl group (hereinafter occasionally referred to as "component (e)").

Further, the catalyst for polymerization of olefins of the present invention comprises:

(A) the foregoing solid catalyst component for polymerization of olefins (hereinafter occasionally referred to as "solid catalyst component (A)"), (B) an organic aluminum compound (hereinafter occasionally referred to as "component (B)") represented by the general formula:

$$R^2_p AlQ_{3-p}$$

(wherein $R^2$ represents a $C_{1-4}$ alkyl group; Q represents a hydrogen or a halogen atom such as chlorine, bromine and iodine; and p represents a real number of from more than 0 to not more than 3); and (C) an organic silicon compound (hereinafter occasionally referred to as "component (C)") represented by the general formula:

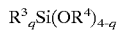

(wherein $R^3$ and $R^4$ represents a hydrocarbon group including $C_{1-12}$-alkyl cycloalkyl, phenyl, allyl, aralkyl and vinyl groups which may be the same or different; and q represents 0 or an integer of from 1 to 3).

Best embodiment for implementing the Invention

Specific examples of the component (a) used for preparing the solid catalyst component (A) of the present invention are dimethoxymagnesium, diethoxymagnesium, dipropoxymagnesium, dibutoxymagnesium, ethoxymethoxymagnesium, ethoxypropoxymagnesium, butoxyethoxymagnesium etc. These dialkoxymagnesium may be obtained by reacting magnesium metal with alcohol in the presence of a halogen or a halogen-containing metal compound. Among the foregoing dielkoxymagnesium, diethoxymagnesium and dipropoxymagnesium are used particularly preferably. The forgoing dialkoxymagnesium may be used in combination of two or more of them.

The component (a) may be used in granular or powder form to prepare the solid catalyst component (A) of the present invention. The particle shape of the component (a) may be amorphous or spherical. If a spherical particulate component (a) is used, a polymer powder having a better particle shape and a narrower particle size distribution can be obtained. Thus, the polymer powder produced can be easily handled during the polymerization, eliminating troubles such as blocking caused by the fine powder contained in the polymer powder produced.

The foregoing spherical particulate component (a) does not necessarily need to be truly spherical but may be ellipsoidal or pebble-like. In some detail, the shape of the particle is normally not more than 3, preferably from 1 to 2, more preferably from 1 to 1.5 as calculated in terms of the ratio of major axis length l to minor axis length w (l/w).

Further, the foregoing component (a) ium may have an average particle diameter of normally from 1 $\mu$m to 200 $\mu$m, preferably from 5 $\mu$m to 150 $\mu$m, more preferably from 10 $\mu$m to 100 $\mu$m. Further, referring to its particle size, the foregoing component (a) preferably has a narrow particle size distribution comprising less fine and coarse powder. In some detail, it is preferred to have the particle size distribution comprising particles having a particle size of not more than 5 $\mu$m in an amount of not more than 20%, preferably not more than 10%, and particles having a particle size of at least 100 $\mu$m in an amount of not more than 10%, more preferably not more than 5%. The particle size distribution is not more than 3, preferably not more than 2 as calculated in terms of in $(D_{90}/D_{10})$ (wherein $D_{90}$ represents the particle diameter at the point where the accumulated particle size reaches 90% and $D_{10}$ represents the particle diameter at the point where the accumulated particle size reaches 10%).

The compound (b) to be used in the preparation of the solid catalyst component (A) of the present invention is preferably one or more of titanium tetrahalide or alkoxytitanium halide represented by the general formula $Ti(OR^1)_nX_{4-n}$ (wherein $R^1$ represents a $C_{1-4}$-alkyl group; X represents a bromine atom, a chlorine atom and an iodine atom; and n represents a real number of from not less than 0 to not more than 3).

Specific examples of the component (b) include a titanium tetrahalide such as titanium tetrachloride, titanium tetrabromide and titanium tetraiodide, an alkoxytitanium halide such as methoxy titanium trichloride, ethoxy titanium, trichloride, propoxy titanium trichloride, n-butoxy titanium trichloride, dimethoxy titanium dichloride, diethoxy titanium dichloride, dipropoxy titanium dichloride, di-n-butoxy titanium dichloride, trimethoxy titanium chloride, triethoxy titanium chloride, tripropoxy titanium chloride and tri-n-butoxy titanium chloride. Preferred among these titanium compounds is titanium tetrahalide. Particularly preferred is titanium tetrachloride ($TiCl_4$). These titanium compounds may be used in combination of two or more of them.

The component (c) to be used in the preparation of the solid catalyst component (A) of the present invention is preferably one or more of a diester of phthalic acid or a diester of terephthalic acid.

Specific examples of these diesters of phthalic acid include dimethyl phthalate, diethyl phthalate, di-n-propyl phthalate, diisopropyl phthalate, di-n-butyl phthalate, diisobutyl phthalate, ethylmethyl phthalate, methyl(isopropyl) phthalate, ethyl(n-propyl) phthalate, ethyl(n-butyl) phthalate, ethyl (iso-butyl) phthalate, di-n-pentyl phthalate, di-iso-pentyl phthalate, dihexyl phthalate, di-n-heptyl phthalate, di-n-octyl phthalate, bis(2,2-dimethylhexyl) phthalate, bis (2-ethylhexyl) phthalate, di-n-nonyl phthalate, di-iso-decyl phthalate, bis(2,2-dimethylheptyl) phthalate, n-butyl(iso-hexyl) phthalate, n-butyl(2-ethylhexyl) phthalate, n-pentylhexyl phthalate, n-pentyl(iso-hexyl) phthalate, isopentyl(heptyl) phthalate, n-pentyl(2-ethylhexyl) phthalate, n-pentyl(iso-nonyl) phthalate, isopentyl (n-decyl) phthalate, n-pentylundecyl phthalate, isopentyl (iso-hexyl) phthalate, n-hexyl(2-methylhexyl) phthalate, n-hexyl(2-ethylhexyl) phthalate, n-hexyl(iso-nonyl) phthalate, n-hexyl(n-decyl) phthalate, n-heptyl(2-ethylhexyl) phthalate, n-heptyl(iso-nonyl) phthalate, n-heptyl(neo-decyl) phthalate, and 2-ethylhexyl(iso-nonyl) phthalate. These diesters of phthalic acid may be used singly or in combination of two or more of them.

Specific examples of these diesters of terephthalic acid include dimethyl terephthalate, diethyl terephthalate, di-n-propyl terephthalate, di-iso-propyl terephthalate, di-n-butyl terephthalate, di-iso-butyl terephthalate, ethylmethyl terephthalate, methyl(iso-propyl) terephthalate, ethyl(n-propyl) terephthalate, ethyl(n-butyl) terephthalate, ethyl(iso-butyl) terephthalate, di-n-pentyl terephthalate, di-iso-pentyl terephthalate, dihexyl terephthalate, di-n-heptyl terephthalate, di-n-octyl terephthalate, bis(2,2-dimethylhexyl) terephthalate, bis(2-ethylhexyl) terephthalate, di-n-nonyl terephthalate, di-iso-decyl terephthalate, bis(2,2-dimethylheptyl) terephthalate, n-butyl (iso-hexyl) terephthalate, n-butyl(2-ethylhexyl) terephthalate, n-pentylhexyl terephthalate, n-pentyl(iso-hexyl) terephthalate, isopentyl(heptyl) terephthalate, n-pentyl(2-ethylhexyl) terephthalate, n-pentyl(iso-nonyl) terephthalate, isopentyl(n-decyl) terephthalate, n-pentylundecyl terephthalate, iso-pentyl (iso-hexyl) terephthalate, n-hexyl(2-ethylhexyl) terephthalate, n-hexyl (2-ethylhexyl) terephthalate, n-hexyl(iso-nonyl) terephthalate, n-hexyl(n-decyl) terephthalate, n-heptyl(2-ethylhexyl) terephthalate, n-heptyl (iso-nonyl) terephthalate, n-heptyl(neo-decyl) terephthalate, and 2-ethylhexyl(iso-nonyl) terephthalate. These diesters of terephthalic acid may be used singly or in combination of two or more of them.

Among these diesters preferred are diesters of phthalic acid, more preferred are diethyl phthalate, di-n-propyl phthalate, di-iso-propyl phthalate, di-n-butyl phthalate, di-iso-butyl phthalate, di-n-octyl phthalate, bis(2-ethylhexyl)phthalate, and di-iso-decyl phthalate.

The component (d) to be used in the solid catalyst component (A) of the present invention is preferably an aromatic hydrocarbon of liquid state at a room temperature.

Specific examples of these aromatic hydrocarbons are benzene, toluene, xylene, ethylbenzene, propylbenzene and trimethylbenzene, etc. More preferred are toluene and xylene. Further, an inert organic solvent other than the component (d) set force above can be used together. These inert organic solvents are a saturated hydrocarbon including hexane, heptane and cyclohexane.

The component (e) to be used in the solid catalyst component (A) of the present invention is one or more silicon compound containing a hydroxyl group represented by the following general formula (1):

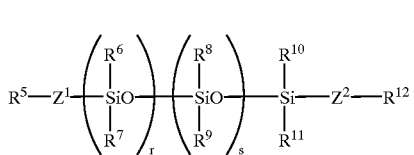

(wherein $R^5$ and $R^{12}$ represent a methyl group or hydroxyl group which may be the same or different; $R^6$, $R^7$, $R^8$, $R^{10}$ and $R^{11}$ represent a methyl group or a phenyl group which may be the same or different; $R^9$ represents a $C_{1-10}$ alkyl group which may have a hydroxyl group; $Z^1$ and $Z^2$ represent a single bond or a divalent hydrocarbon group, specifically, a $C_{1-10}$-alkylene group which may be the same or different; r represents a real number of from not less than 0 to not more than 30,000; s represents a real number of from not less than 0 to not more than 30,000; and at least one of $R^5$ and $R^{12}$ represents a hydroxyl group when $R^9$ does not include a hydroxyl group).

As specific examples of the forgoing compounds, the following general formula (2) to (7) can be given;

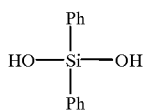

(wherein Ph represents a phenyl group). TSL8162 (Toshiba Silicon) can be given as a specific example.

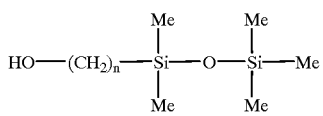

(wherein Me represents a methyl group and n represents 0 or an integer of from 1 to 10). TSL8238 (Toshiba Silicon) can be given as a specific example.

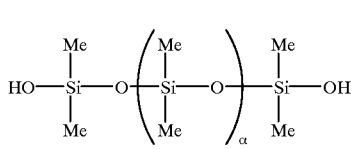

(wherein Me represents a methyl group; a represents a real number of from not less than 2 to not more than 30,000). YF3800, XF3905, YF3057, YF3807, YF3802 and YF3897 (Toshiba Silicon) can be given as a specific example.

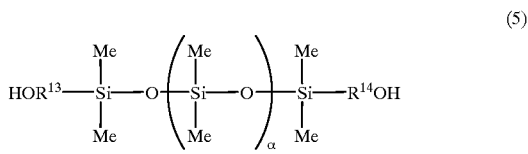

(wherein $R^{13}$ and $R^{14}$ represent a $C_{1-10}$-alkylene group; Me and α are the same meaning to the above). TSF4751 (Toshiba Silicon) can be given as a specific example.

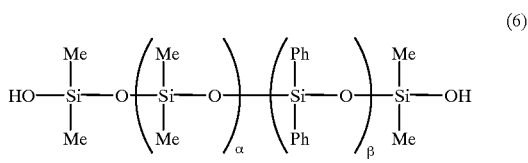

(wherein Me, Ph and a are the same meaning to the above; β represents a real number of from not less than 2 to not more than 30,000). YF3804 (Toshiba Silicon) can be given as a specific example.

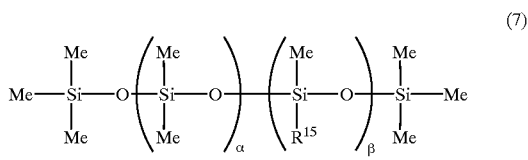

(wherein Me, α and β are the same meaning to the above; $R^{15}$ represents a $C_{1-10}$-alkyl group containing a hydroxyl group). TSF4750 (Toshiba Silicon) can be given as a specific example.

Among the foregoing compounds, preferred are XF3905, YF3800, YF3807, TSL8238, TSF4750 and TSF4751.

The component (e) may be contacted with the other components directly or used by diluting with an organic solvent including an aromatic hydrocarbon such as toluene and xylene or an aliphatic hydrocarbon such as hexane and heptane.

In the preparation of the solid catalyst component (A) of this invention, a polysiloxane may be used other than the above essential components.

As the polysiloxanes there may be used one or more compounds represented by the following general formula;

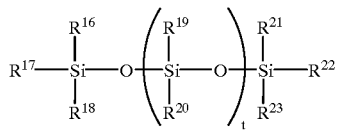

(In the foregoing general formula, t represents an average polymerization degree of from 2 to 30,000. Most of $R^{16}$ to $R^{23}$ each represents a methyl group, and some of $R^{16}$ to $R^{23}$ may be substituted with a phenyl group, hydrogen atom, higher fatty acid residue, epoxy-containing group or polyoxyalkylene group. The compound represented by the forgoing general formula may form a cyclic polysiloxane in which $R^{19}$ and $R^{20}$ each are methyl group.)

The polysiloxane is generically called silicone oil. It is a chain, partial hydrogenated, cyclic or denatured polysiloxane having a viscosity of from 2 to 10,000 cSt, preferably from 3 to 500 cSt, at 25° C. which stays liquid or viscous at a room temperature.

Specific examples of the polysiloxane are dimethyl polysiloxane and methyl phenyl polysiloxane as a chain polysiloxane, methyl hydrogen polysiloxane of which the rate of hydrogenation is 10 to 80% as a partial hydrogenated polysiloxane, hexamethylcyclotrisiloxane, octamethylcyclotetrasiloxane, decamethylcyclopentasiloxane, 2,4,6-trimethylcyclotrisiloxane, and 2,4,6,8-tetramethylcyclotetrasiloxane as a cyclic polysiloxane and higher fatty acid-substituted dimethylsiloxane, epoxy-substituted dimethylsiloxane, and polyoxyalkylene-substituted dimethylsiloxane as a denatured polysiloxane.

The contact for each component is conducted under an atmosphere of an inert gas and a condition of eliminating water, etc. with stirring in a vessel with agitator. The temperature for contacting can be set up at relatively low temperature range of around room temperature in the case of simply mixing with stirring after contacting or conducting a denatured treatment by dispersing or suspending. However, in the case of obtaining a product by reacting after contacting, the temperature for contacting is preferably at the temperature range from 40 to 130° C. If the temperature at reaction is less than 40° C., such reaction is not proceeded completely and the efficiency of the resulting solid component becomes insufficient. If the temperature of the reaction exceeds 130° C., the reaction is hard to control because the solvent used in reaction vaporizes extremely. The time for reaction is usually 1 minute or more, preferably 10 minutes to 100 hours, more preferably 30 minutes to 50 hours.

The order of contact for each component in the preparation of solid catalyst component (A) of this invention is described below;

(1) Component (a) is suspended with component (d), and component (e) is contacted after component (b) and component (c) are contacted with said suspension.
(2) Component (a) is suspended with component(d), and component (b) and component (c) are contacted after component (e) is contacted with said suspension.
(3) Component (a) and component (c) are suspended with component (d), and said suspension is added to component (b), and then component (e) is contacted thereto.
(4) Component (a) and component (e) are suspended with component (d), and component (b) and component (c) are contacted with said suspension.
(5) Component (a) is suspended with component (d), and component (b), component (d) and component (e) are contacted after component (b) and component (c) are contacted with said suspension.
(6) Component (a) is suspended with component (d), and component (b), component (d) and component (e) are contacted after component (b) and component (c) are contacted with said suspension and the solid component thus obtained is washed with component (d).

In the methods for contacting above, the components can contact in plural times. A polysiloxane can contact at any time of the contact above.

Preferred examples of the process for the preparation of the solid catalyst component (A) of this invention will be given below:

(1) Component (a) is suspended with component (d), and said suspension is brought into contacting with component (b) at −20 to 100° C., preferably, −10 to 50° C. The suspension is reacted at 0 to 130° C., preferably 60 to 130° C. Before or after contacting component (b) with said suspension, one or more of component (c) is contacted at −20 to 130° C., preferably, 20 to 100° C. to obtain a solid product. The solid product prefers to wash with a hydrocarbon compound, which is liquid at a room temperature. Thereafter, the solid product is brought in to contact with component (e) at −20 to 130° C., preferably, −10 to 90° C. after the solid product is suspended with component (d). Preferably, component (b) is further contacted and reacted at 0 to 130° C., preferably, 60 to 130° C. In this step, one or more of component (c) may be contacted at −20 to 130° C., preferably, 20 to 100° C. before or after contacting the solid product with component (b). In any step above, a polysiloxane may be used upon occasion Although times for reaction in the presence of component (b) is not limited in each step above, the time is usually in the range of 1 minutes to 100 hours, preferably 30 minutes to 50 hours.

(2) Component (a) and one or more of component (c) are suspended with component (d), and said suspended is brought into contacting with component (b) at −20 to 100° C., preferably −10 to 50° C. The suspension is reacted at 0 to 130° C., preferably 60 to 130° C. to obtain a solid product. Before or after component (b) is contacted with the suspension, one or more of component (c) may be contacted at −20 to 130° C., preferably 20 to 100° C. The solid product prefers to wash with a hydrocarbon compound, which is liquid at a room temperature. Thereafter, the solid product is brought into contacting with component (e) at −20 to 130° C., preferably, −10 to 90° C. after the solid product is suspended with component (d). Preferably, component (b) is further contacted at 0 to 130° C., preferably 60 to 130° C. Preferably, one or more of component (c) is contacted at −20 to 130° C., preferably, 20 to 100° C. before or after component (b) is contacted with the solid product. A polysiloxane may be used in any step above upon occasion. Although times for reaction in the presence of component (b) is not limited in each step above, the time is usually in the range of 1 minutes to 100 hours, preferably 30 minutes to 50 hours.

As described above, an organic silicon compound including a hydroxyl group of component (e) is contacted with the other components in this invention. Contacting component (e) in the presence of component (b) and contacting component (b) after contacting component (e) are preferable methods for contacting in order to realize effects of the present invention. Component (b) prefers to contact at two or more times for improving a catalyst activity and the contact of component (e) preferably conducts at the time of the second or more contact of component (b) The amount of each compound to be used in the preparation of solid catalyst component (A) is not specifically limited because it is differed depending on the preparation method. Preferably, the following amounts are adopted; Specific examples of the proportion of component (b) is from 0.5 to 100 mols, preferably from 0.5 to 50 mols, more preferably from 1 to 10 mols per mol of component (a). The proportion of component (c) is from 0.001 to 10 mols, preferably from 0.01 to 1 mol, more preferably from 0.02 to 0.6 mol per mol of component (a). The proportion of component (d) is 0.001 to 500 mol, preferably from 0.001 to 100 mols, more preferably from 0.005 to 10 mols per mol of component (a). The proportion of component (e) is 0.001 to 1000 ml, preferably from 0.005 to 800 ml, more preferably from 0.01 to 500 ml per mol of component (a).

In the preparation process for solid catalyst component (A) of this invention specified above, particularly preferable components to be used and particularly preferable combination of the components are as follows; the component (a)

is diethoxymagnesium and/or dipropoxymagnesium, component (b) is titanium tetrachloride, component (c) is a diester of phthalic acid, preferably one or more of diethyl phthalate, di-n-propyl phthalate, di-n-butyl phthalate, di-iso-butyl phthalate, di-n-octyl phthalate, bis(2-ethylhexyl) phthalate, and di-iso-decyl phthalate, component (d) is toluene or xylene, and component (e) is one or more of XF3905, YF3800, YF3807, TSL8238, TSF4750, TSF4751, and a structural equivalent of these compound.

By using the components above and taking the amounts and the preparation processes above, the solid catalyst component (A) of the present invention can control a forming rate of a polymerization solvent-soluble polymer at a very low level without deteriorating the catalyst properties such as catalyst activity and stereoregularity.

As the compound (B) to be used to form a catalyst for polymerization of olefins of the present invention, there may be used organic aluminum compounds represented by organic aluminum compounds represented by the general formula: $R^2_p AlQ_{3-p}$, (in which $R^2$ represents a $C_{1-4}$-alkyl group; Q represents a hydrogen atom or a halogen atom such as bromine, chlorine, iodine; and p represents a real number of more than 0 to not more than 3). Specific examples of the compound (B) include triethylaluminum, diethylaluminum chloride, tri-iso-butyl-aluminum, diethylaluminum bromide, and diethylaluminum hydride. These organic aluminum compounds may be used singly or in combination of two or more of them. Preferred among these organic aluminum compounds are triethylaluminum, and tri-iso-butylaluminum.

As the compound (C) to be used to form a catalyst for polymerization of olefins of the present invention, there may be used organic silicon compounds represented by the general formula $R^3_q Si(OR^4)_{4-q}$, (in which $R^3$ and $R^4$ may be the same or different and represent a $C_{1-12}$-alkyl, cycloalkyl, phenyl, allyl, aralkyl or vinyl group; and q represents 0 or an integer of from 1 to 3).

The preferred hydrocarbon groups for $R^3$, which may be the same or different, include $C_{1-12}$-alkyl, cycloalkyl, phenyl, vinyl, allyl and aralkyl groups, and the preferred hydrocarbon groups for $R^4$, which may be the same or different, include $C_{1-4}$-alkyl, cycloalkyl, phenyl, vinyl, allyl and aralkyl groups. Specific examples of the organic silicon compound include phenylalkoxysilane, alkylalkoxysilane, phenylalkylalkoxysilane, cycloalkylalkoxysilane and cycloalkylalkylalkoxysilane.

Specific examples of the foregoing organic silicon compound include trimethylmethoxysilane, trimethylethoxysilane, tri-n-propylmethoxysilane, tri-n-propylethoxysilane, tri-n-butylmethoxysilane, tri-iso-butylmethoxysilane, tri-t-butylmethoxysilane, tri-n-butylethoxysilane, tricyclohexylmethoxysilane, tricyclohexylethoxysilane, dimethyldimethoxysilane, dimethyldiethoxysilane, di-n-propyldimethoxysilane, di-iso-propyldimethoxysilane, di-n-propyldiethoxysilane, di-iso-propyldiethoxysilane, di-n-butyldimethoxysilane, di-iso-butyldimethoxysilane, di-t-butyldimethoxysilane, di-n-butyldiethoxysilane, n-butyl-methyldimethoxysilane, bis(2-ethylhexyl)dimethoxysilane, bis(2-ethylhexyl)diethoxysilane, dicyclohexyldimethoxysilane, dicyclohexyldiethoxysilane, dicyclopentyldimethoxysilane, dicyclopentyldiethoxysilane, cyclohexylmethyldimethoxysilane, cyclohexylmethyldiethoxysilane, cyclohexylethyldimethoxysilane, cyclohexyl(iso-propyl)dimethoxysilane, cyclohexylethyldiethoxysilane, cyclopentylmethyldimethoxysilane, cyclopentylmethyldiethoxysilane, cyclopentylethyldiethoxysilane, cyclopentyl(iso-propyl)dimethoxysilane, cyclohexyl(n-pentyl)dimethoxysilane, cyclohexyl(n-pentyl)diethoxysilane, cyclopentyl(iso-butyl)dimethoxysilane, cyclohexyl(n-propyl)dimethoxysilane, cyclohexyl(n-propyl)diethoxysilane, cyclohexyl(n-butyl)diethoxysilane, cyclohexyl(iso-butyl)dimethoxysilane, diphenyldimethoxysilane, diphenyldiethoxysilane, phenylmethyldimethoxysilane, phenylmethyldiethoxysilane, phenylethyldimethoxysilane, phenylethyldiethoxysilane, cyclohexyldimethylmethoxysilane, cyclohexyldiethylmethoxysilane, cyclohexyldiethylethoxysilane, 2-ethylhexyltrimethoxysilane, 2-ethylhexyltriethoxysilane, ethyltrimethoxysilane, methyltriethoxysilane, ethyltrimethoxysilane, ethyltriethoxysilane, n-propyltrimethoxysilane, n-propyltriethoxysilane, iso-propyltrimethoxysilane, iso-propyltriethoxysilane, n-butyltrimethoxysilane, isobutyltrimethoxysilane, t-butyltrimethoxysilane, n-butyltriethoxysilane, cyclohexyltrimethoxysilane, cyclohexyltriethoxysilane, cyclopentyltrimethoxysilane, cyclopentyltriethoxysilane, vinyltrimethoxysilane, vinyltriethoxysilane, 2-ethylhexyltrimethoxysilane, 2-ethylhexyltriethoxysilane, phenyltrimethoxysilane, phenyltriethoxysilane, tetramethoxysilane, tetraethoxysilane, cyclohexylcyclopentyldimethoxysilane, cyclohexylcyclopentyldiethoxysilane, cyclohexylcyclopentyldipropoxysilane, 3-methylcyclohexylcyclopentyldimethoxysilane, 4-methylcyclohexylcyclopentyldimethoxysilane, 3,5-dimethylcyclohexylcycloentyldimethoxysilane, 3-methylcyclohexylcyclohexyldimethoxysilane, bis(3-methylcyclohexyl)dimethoxysilane, 4-methylcyclohexylcyclohexyldimethoxysilane, bis(4-methylcyclohexyl)dimethoxysilane, 3,5-dimethylcyclohexylcyclohexyldimethoxysilane, bis(3,5-dimethylcyclohexyl)dimethoxysilane, tetramethoxysilane, tetraethoxysilane, tetrapropoxysilane and tetrabutoxysilane. Preferred among these organic silicon compounds are di-n-propyldimethoxysilane, di-iso-propyldimethoxysilane, di-n-butyldimethoxysilane, di-iso-butyldimethoxysilane, di-t-butyldimethoxysilane, di-n-butyldiethoxysilene, t-butyl-trimethoxysilane, dicyclohexyldimethoxysilane, dicyclohexyldiethoxysilane, cyclohexylmethyldimethoxysilane, cyclohexylmethyldiethoxysilane, cyclohexylethyldimethoxysilane, cyclohexylethyldiethoxysilene, dicyclopentyldimethoxysilane, dicyclopentyldiethoxysilane, cyclopentylmethyldimethoxysilane, cyclopentylmethyldiethoxysilane, cyclopentylethyldiethoxysilane, cyclohexylcyclopentyldimethoxysilane, cyclohexylcyclopentyldiethoxysilane, 3-methylcyclohexylcyclopentyldimethoxysilan, 4-methylcyclohexylcyclopentyldimethoxysilane, and 3,5-dimethylcyclopentyldimethoxysilane. These compounds (C) may be used singly or in combination of two or more of them.

In order to polymerize olefins using a catalyst for producing polymers of olefins of the present invention, the homopolymerization or copolymerization of propylene is accomplished in the presence of a catalyst made of the foregoing solid catalyst component (A), compound (B) and compound (C). The ratio of the various components to be used is arbitrary and not specifically limited unless the effects of the present invention are impaired. In general, the proportion of the compound (B) is from 1 to 1,000 mols, preferably from 50 to 800 mols per mol of titanium atom in the solid catalyst component (A). The proportion of the compound (C) is from 0.002 to 10 mols, preferably from 0.01 to 2 mols, more preferably from 0.01 to 0.5 mol per mol of the component (B).

The order of contact of each component is arbitrary. Preferably, compound (B) is charged first into a polymerization system, and then brought into contact with compound (C), and further contact with solid catalyst component (A).

The process for polymerization of the present invention may be carried out in the presence or absence of an organic solvent. The olefin monomer may be used in either a gaseous state or a liquid state. Further, hydrogen may be used during the polymerization as a molecular weight control agent. The polymerization can be carried out without using the molecular weight control agent. The polymerization temperature is not higher than 200° C., preferably not higher than 100° C. The polymerization pressure is not higher than 10 MPa, preferably not higher than 5 MPa. The continuous polymerization process or batchwise polymerization process may be applied. Further, the polymerization reaction may be carried out in one step or two or more steps.

The olefins to be homopolymerized or copolymerized using the catalyst of the present invention include long chain olefins such as ethylene, propylene, 1-butene, 1-pentene, 1-hexene, 1-heptene, 1-octene and 1-decene, branched olefins such as 3-methyl-1-butene and 4-methyl-l-pentene, dienes such as butadiene, vinylcyclopentane and vinylcyclohexane. The catalyst of the present invention can particularly preferably applied to a polymerization of ethylene or propylene. These olefins may be used singly or in combination of two or more of them.

The polymerization (hereinafter referred as "main polymerization") of olefins in the presence of the catalyst made of the foregoing solid catalyst component (A) and compound (B) and optionally compound (C) in the present invention is preferably preceded by prepolymerization to further enhance the catalytic activity and the stereoregularity, particle properties of the polymer thus produced and the like. As the olefins to be used in the prepolymerization there may be used the same olefins as main polymerization or monomers such as styrene.

In the prepolymerization, the order of contact for each component and monomer is arbitrary. Preferably, the compound (B) is charged into the prepolymerization system set up to the atmosphere of inert gas or olefin gas to be polymerized, and after contacting with the solid catalyst component (A), brought into contact with one or more olefins. In the case of conducting prepolymerization on combination with the organic silicon compound, preferably, the compound (B) is charged into the prepolymerization system set up to the atmosphere of inert gas or olefin gas to be polymerized, and after contacting with the compound (C) and further the solid catalyst component (A), and then brought into contact with one or more olefins.

EXAMPLES

The present invention will be further described in detail, comparing the following examples with the comparative examples.
<Polymerization Evaluation>
The evaluation of slurry polymerization of propylene was conducted by using the catalyst for polymerization of olefins of the present invention, and polymerization activity per solid catalyst component and an amount of polymer undissolved when the produced polymer was extracted with boiling n-heptane for 6 hours by a high-temperature type Soxhlet's extractor (HI) and rate of forming a polymerization solvent-soluble polymer were measured. Polymerization activity, HI and rate of forming soluble matter were calculated by the following equation (8) to (10). Further, with regard to the polymer produced, melt flow rate (MI), and bulk density (BD) were measured. The measurement methods of MI and BD were conducted in accordance with JIS K 7210 and JIS K 6721 respectively.

Polymerization Activity(g-PP/g-cat. )={a(g)+c(g)}/solid catalyst component(g)     (8)

HI(wt. %)={b(g)/a(g)}×100     (9)

Rate of forming soluble matter(wt. %)={c(g)/(a(g)+c(g))}×100 (10)

In the equations (8) to (10), a shows a weight of solid polymer produced after termination of polymerization reaction, b shows a weight of n-heptane undissolved polymer when solid polymer produced after termination of polymerization reaction was extracted with boiling n-heptane for 6 hours, and c shows an amount of polymer dissolved in a polymerization solvent filtrated after termination of polymerization reaction.

EXAMPLE 1

<Preparation of solid catalyst component>
Into a 2000-ml round flask equipped with an agitator in which the air within had been thoroughly replaced by nitrogen gas were charged 100 g of diethoxymagnesium and 800 ml of toluene, and then 200ml of titanium tetrachloride was charged. The mixed solution was subjected to aging reaction by agitation for 1 hour maintaining the temperature of 30° C. 52 ml of bis(2-ethylhexyl)phthalate, 2.0 ml of diethyl phthalate and 40 ml of polysiloxane(TSF451-100, product made by Toshiba Silicon) were added to the mixture at 50° C., 70° C. and 85° C. respectively. The temperature of the reaction system was raised to 110° C. and then reacted for 1.5 hours with stirring. After the termination of the reaction, a supernatant was removed and 800 ml of toluene and 200 ml of titanium tetrachloride were newly added to the reaction system and reacted at 110° C. for 15 minutes. After the termination of the reaction, the resulting product was washed with toluene and 800 ml of toluene, 200 ml of titanium tetrachloride and 50 ml of polysiloxanediol (YF3800, Toshiba Silicone) were newly added thereto. The mixture was then heated to 100° C. and reacted 2 hours with stirring. Thereafter, the resulting product was washed with n-heptane, separated by filtration and dried to obtain a powdered solid catalyst component (A). The solid catalyst component (A) was then measured for titanium content. The result was 1.91% by weight.
<Polymerization>
Into a 1500 ml autoclave equipped with an agitator in which the air within had been completely replaced by nitrogen gas were charged 700 ml of n-heptane and then charged 2.1 mmol of triethylaluminum, 0.21 mmol of cyclohexylmethyldimethoxysilane and the foregoing solid catalyst component (A) in an amount of 0.0053 mmol as calculated in terms of titanium atom with stirring to form a polymerization catalyst. Thereafter, the polymerization system was pressured with a propylene gas to 0.1 MPa, and allowed to undergo prepolymerization at a temperature of 20° C. for 30 minutes. Into the autoclave were then charged 80 ml of hydrogen gas and pressured with a propylene gas to 0.6 MPa and allowed to main polymerization at a temperature of 70° C. for 2 hour. The results of the evaluation of polymerization are set forth in Table 1.

EXAMPLE 2

The same procedure as in Example 1 was repeated to effect the preparation of a solid catalyst component (A) and the polymerization evaluation thereof except that XF3905 (Toshiba Silicon) was used instead of YF3800. Titanium content of the resulting solid catalyst component (A) was 1.88% by weight. The results of the evaluation of polymerization are also set forth in Table 1.

EXAMPLE 3

The same procedure as in Example 1 was repeated to effect the preparation of a solid catalyst component (A) and the polymerization evaluation thereof except that XF3807 (Toshiba Silicon) was used instead of YF3800. Titanium content of the resulting solid catalyst component (A) was 1.86% by weight. The results of the evaluation of polymerization are also set forth in Table 1.

EXAMPLE 4

The same procedure as in Example 1 was repeated to effect the preparation of a solid catalyst component (A) and the polymerization evaluation thereof except that TSL8238 (Toshiba Silicon) was used instead of YF3800. Titanium content of the resulting solid catalyst component (A) was 1.92% by weight. The results of the evaluation of polymerization are also set forth in Table 1.

EXAMPLE 5

The same procedure as in Example 1 was repeated to effect the preparation of a solid catalyst component (A) and the polymerization evaluation thereof except that TSF4750 (Toshiba Silicon) was used instead of YF3800. Titanium content of the resulting solid catalyst component (A) was 2.01% by weight. The results of the evaluation of polymerization are also set forth in Table 1.

EXAMPLE 6

The same procedure as in Example 1 was repeated to effect the preparation of a solid catalyst component (A) and the polymerization evaluation thereof except that TSF4751 (Toshiba Silicon) was used instead of YF3800. Titanium content of the resulting solid catalyst component (A) was 1.79% by weight. The results of the evaluation of polymerization are also set forth in Table 1.

COMPARATIVE EXAMPLE 1

The same procedure as in Example 1 was repeated to effect the preparation of a solid catalyst component (A) and the polymerization evaluation thereof except that YF3800 was not used. The solid catalyst component (A) was then measured for titanium content. The result was 2.24% by weight. The results of the evaluation of polymerization are also set forth in Table 1.

COMPARATIVE EXAMPLE 2

The same procedure as in Example 1 was repeated to effect the preparation of a solid catalyst component (A) and the polymerization evaluation thereof except that 10 g of $AlCl_3$ was used instead of YF3800. The solid catalyst component (A) was then measured for titanium content. The result was 2.73% by weight. The results of the evaluation of polymerization are also set forth in Table 1.

TABLE 1

| | Polymerization Activity (*1) | HI (*2) | Rate of forming polymerization solvent-soluble matter (*3) | BD (*4) | MI (*5) |
|---|---|---|---|---|---|
| Example 1 | 20,400 | 99.4 | 0.20 | 0.42 | 2.7 |
| Example 2 | 20,100 | 99.2 | 0.23 | 0.40 | 2.2 |
| Example 3 | 19,900 | 99.3 | 0.19 | 0.41 | 2.6 |
| Example 4 | 20,500 | 99.4 | 0.18 | 0.39 | 3.3 |
| Example 5 | 21,500 | 99.4 | 0.17 | 0.40 | 3.5 |
| Example 6 | 19,100 | 99.2 | 0.25 | 0.41 | 2.8 |
| Comparative Example 1 | 18,900 | 99.0 | 0.43 | 0.37 | 2.8 |
| Comparative Example 2 | 19,900 | 96.4 | 1.85 | 0.37 | 3.6 |

*1: g-PP/g-cat.
*2, *3: wt.%
*4: g/ml
*5: g/10 min

Industrial applicability

The solid catalyst component and catalyst of the present invention can show high polymerization activity and obtain a high stereoregular polymer in a high yield at the polymerization of olefins. In case that olefins are allowed to conduct polymerization by slurry polymerization process, the rate of forming a polymerization solvent-soluble polymer can decrease within 10 to 50% the rate in case where a conventional catalyst is used, with maintaining a catalyst activity and a stereoregularity in a high level in comparison. As the result, the easiness of process operability and the reduction in production cost in the production of product can be achieved.

What is claimed is:

1. A solid catalyst component for polymerization of olefins prepared by contacting the following components (a), (b), (c), (d), and (e);
   (a) a dialkoxymagnesium;
   (b) a titanium compound represented by the general formula $Ti(OR^1)_n X_{4-n}$ (wherein $R^1$ represents a $C_{1-4}$-alkyl group; X represents a chlorine atom, a bromine atom or an iodine atom; and n represents a real number of from not less than 0 to not more than 3),
   (c) a diester of an aromatic dicarboxylic acid,
   (d) an aromatic hydrocarbon and
   (e) a polysiloxane containing a hydroxyl group.

2. A solid catalyst component for polymerization of olefins as in claim 1, wherein said polysiloxane containing a hydroxyl group (e) is a compound represented by the general formula:

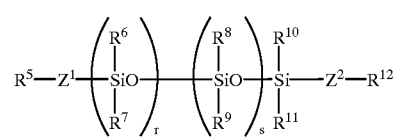

(wherein $R^5$ and $R^{12}$ represent a methyl group or hydroxyl group which may be the same or different; $R^6$, $R^7$, $R^8$, $R^{10}$ and $R^{11}$ represent a methyl group or a phenyl group which may be the same or different; $R^9$ represents a $C_{1-10}$ alkyl group which may have a hydroxyl group; $Z^1$ and $Z^2$ represent a single bond or a divalent hydrocarbon group which may be the same or different; r represents a real number of from not less than 0 to not more than 30,000; s represents a real number of from not less than 0 to not more than 30,000, at least one of r and s being a real number of at least 1; and at least one of $R^5$ and $R^{12}$ represents a hydroxyl group when $R^9$ does not include a hydroxyl group).

3. A solid catalyst component for polymerization of olefins as in claim 1, wherein said dialkoxymagnesium as the component (a) is one or more selected from a group consisting of dimethoxymagnesium, diethoxymagnesium, dipropoxymagnesium, dibutoxymagnesium, ethoxymethoxymagnesium, ethoxypropoxymagnesium and butoxyethoxymagnesium.

4. A solid catalyst component for polymerization of olefins as in claim 1, wherein said dialkoxymagnesium as the component (a) is diethoxymagnesium or dipropoxymagnesium.

5. A solid catalyst component for polymerization of olefins as in claim 1, wherein said titanium compound as the component (b) is a titanium tetrahalide.

6. A solid catalyst component for polymerization of olefins as in claim 1, wherein said diester of an aromatic dicarboxylic acid as the component (c) is a diester of phthalic acid or terephthalic acid.

7. A solid catalyst component for polymerization of olefins as in claim 1, wherein said aromatic hydrocarbon as the component (d) is one or more selected from a group consisting of benzene, toluene, xylene, ethylbenzene, propylbenzene and trimethylbenzene.

8. A solid catalyst component for polymerization of olefins as in claim 1, wherein said aromatic hydrocarbon as the component (d) is toluene or xylene.

9. A solid catalyst component for polymerization of olefins as in claim 1, wherein said solid catalyst component is prepared by contacting a polysiloxane other than (e) with components (a) to (e).

10. A solid catalyst component for polymerization of olefins as in claim 1, wherein a proportion of amount of the component (b) is 0.5 to 100 moles per mol of the component (a), a proportion of amount of the component (c) is 0.01 to 10 moles per mol of the component (a), a proportion of amount of the component (d) is 0.001 to 500 moles per mol of the component (a), and a proportion of amount of the component (e) is 0.001 to 1000 ml per mol of the component (a).

11. A catalyst for polymerization of olefins, prepared from the following components (A), (B) and (C):

(A) the solid catalyst component for polymerization of olefins as defined in claim 1;

(B) an organic aluminum compound represented by the general formula:

(wherein $R^2$ represents a $C_{1-4}$-alkyl group; Q represents a hydrogen atom or a halogen atom including bromine, chlorine and iodine; and p represents a real number of more than 0 to not more than 3); and (C) an organic silicon compound represented by the general formula:

(wherein $R^3$ and $R^4$ may be the same or different and represents a hydrocarbon group including $C_{1-12}$-alkyl, cycloalkyl, phenyl, allyl, aralkyl and vinyl groups; and q represents 0 or an integer of from 1 to 3).

12. A catalyst for polymerization of olefins as in claim 11, wherein a proportion of amount of the component (B) is 1 to 1000 moles per mol of titanium atom in the component (A), and a proportion of amount of the component (C) is 0.002 to 10 moles per mol of the component (B).

13. A catalyst for polymerization of olefins as in claim 11, wherein a proportion of amount of the component (B) is 50 to 800 moles per mol of titanium atom in the component (A), and a proportion of amount of the component (C) is 0.01 to 2 moles per mol of the component (B).

14. A solid catalyst compound for polymerization of olefins as in claim 1, prepared by contacting compounds consisting of (a), (b), (c), (d) and (e).

15. A catalyst for polymerization of olefins as in claim 11, wherein said solid catalyst component (A) is prepared by contacting compounds consisting of (a), (b), (c), (d) and (e); wherein (a) is a dialkoxymagnesium;

(b) is a titanium compound represented by the general formula $Ti(OR^1)_nX_{4-n}$;

wherein $R^1$ =represents a $C_{1-4}$-alkyl group;

X represents a chlorine atom, a bromine atom or an iodine atom; and n represents a real number of from not less than 0 to not more than 3;

(c) is a diester of an aromatic dicarboxylic acid;

(d) is an aromatic hydrocarbon; and (e) is a polysiloxane containing a hydroxyl group.

16. A solid catalyst component for polymerization of olefins prepared by contacting components consisting of the following (a), (b), (c), (d), and (e);

(a) a dialkoxymagnesium;

(b) a titanium compound represented by the general formula $Ti(OR^1)_nX_{4-n}$ (wherein $R^1$ represents a $C_{1-4}$-alkyl group; X represents a chlorine atom, a bromine atom and an iodine atom; and n represents a real number of from not less than 0 to not more than 3), (c) a diester of an aromatic dicarboxylic acid, (d) an aromatic hydrocarbon and (e) an organic silicon compound containing a hydroxyl group.

17. A solid catalyst component for polymerization of olefins as in claim 16, wherein said organic silicon compound containing a hydroxyl group (e) is a compound represented by the general formula:

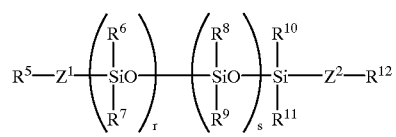

(wherein $R^5$ and $R^{12}$ represent a methyl group or hydroxyl group which may be the same or different; $R^6$, $R^7$, $R^8$, $R^{10}$ and $R^{11}$ represent a methyl group or a phenyl group which may be the same or different; $R^9$ represents a $C_{1-10}$ alkyl group which may have a hydroxyl group; $Z^1$ and $Z^2$ represent a single bond or a divalent hydrocarbon group which may be the same or different; r represents a real number of from not less than 0 to not more than 30,000; s represents a real number of from not less than 0 to not more than 30,000; and at least one of $R^5$ and $R^{12}$ represents a hydroxyl group when $R^9$ does not include a hydroxyl group).

18. A solid catalyst component for polymerization of olefins as in claim 16, wherein said dialkoxymagnesium as the component (a) is one or more selected from a group consisting of dimethoxymagnesium, diethoxymagnesium, dipropoxymagnesium, dibutoxymagneslum, ethoxymethoxymagnesium, ethoxypropoxymagnesium and butoxyethoxymagnesium.

19. A solid catalyst component for polymerization of olefins as in claim 16, wherein said dialkoxymagnesium as the component (a) is diethoxymagnesium or dipropoxymagnesium.

20. A solid catalyst component for polymerization of olefins as in claim 16, wherein said titanium compound as the component (b) is a titanium tetrahalide.

21. A solid catalyst component for polymerization of olefins as in claim 16, wherein said diester of an aromatic dicarboxylic acid as the component (c) is a diester of phthalic acid or terephthalic acid.

22. A solid catalyst component for polymerization of olefins as in claim 16, wherein said aromatic hydrocarbon as the component (d) is one or more selected from a group consisting of benzene, toluene, xylene, ethylbenzene, propylbenzene and trimethylbenzene.

23. A solid catalyst component for polymerization of olefins as in claim 16, wherein said aromatic hydrocarbon as the component (d) is toluene or xylene.

24. A solid catalyst component for polymerization of olefins as in claim 16, wherein said solid catalyst component is prepared by contacting a polysiloxane with components (a) to (e).

25. A solid catalyst component for polymerization of olefins as in claim 16, wherein a proportion of amount of the component (b) is 0.5 to 100 moles per mol of the component (a), a proportion of amount of the component (c) is 0.01 to 10 moles per mol of the component (a), a proportion of amount of the component (d) is 0.001 to 500 moles per mol of the component (a), and a proportion of amount of the component (e) is 0.001 to 1000 ml per mol of the component (a).

26. A catalyst for polymerization of olefins, prepared from the following components (A), (B) and (C):

(A) the solid catalyst component for polymerization of olefins as defined in claim 16;

(B) an organic aluminum compound represented by the general formula:

$$R^2{}_p AlQ_{3-p}$$

(wherein $R^2$ represents a $C_{1-4}$-alkyl group; Q represents a hydrogen atom or a halogen atom including bromine, chlorine and iodine; and p represents a real number of more than 0 to not more than 3); and (C) an organic silicon compound represented by the general formula:

$$R^3{}_q Si(OR^4)_{4-q}$$

(wherein $R^3$ and $R^4$ may be the same or different and represents a hydrocarbon group including $C_{1-12}$-alkyl, cycloalkyl, phenyl, allyl, aralkyl and vinyl groups; and q represents 0 or an integer of from 1 to 3).

27. A catalyst for polymerization of olefins as in claim 26, wherein a proportion of amount of the component (B) is 1 to 1000 moles per mol of titanium atom in the component (A), and a proportion of amount of the component (C) us 0.002 to 10 moles per mol of the component (B).

28. A catalyst for polymerization of olefins as in claim 26, wherein a proportion of amount of the component (B) is 50 to 800 moles per mol of titanium atom in the component (A), and a proportion of amount of the component (C) us 0.01 to 2 moles per mol of the component (B).

* * * * *